US010066722B2

(12) United States Patent
Dewangan et al.

(10) Patent No.: US 10,066,722 B2
(45) Date of Patent: Sep. 4, 2018

(54) LIMITED SLIP DIFFERENTIALS WITH CENTRIFUGAL SPRING MASS ACTUATOR FOR VEHICLE POWERTRAINS

(71) Applicant: GM GLOBAL TECHNOLOGY OPERATIONS LLC, Detroit, MI (US)

(72) Inventors: Yogesh Kumar Dewangan, Dhamtari (IN); Bhaskara K. Ch, Settanagaram (IN); Lokaditya Ryali, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 15/398,748

(22) Filed: Jan. 5, 2017

(65) Prior Publication Data
US 2018/0187762 A1 Jul. 5, 2018

(51) Int. Cl.
*F16H 48/08* (2006.01)
*B60K 17/00* (2006.01)
*F16H 48/22* (2006.01)
*F16H 48/38* (2012.01)
*F16D 43/08* (2006.01)
*F16D 13/42* (2006.01)

(52) U.S. Cl.
CPC ............ *F16H 48/22* (2013.01); *F16D 13/42* (2013.01); *F16D 43/08* (2013.01); *F16H 48/08* (2013.01); *F16H 48/38* (2013.01); F16H 2048/382 (2013.01)

(58) Field of Classification Search
CPC .......... F16H 2048/208; B60K 17/3465; B60K 17/3505
See application file for complete search history.

(56) References Cited
U.S. PATENT DOCUMENTS

| 1,431,535 | A | * | 10/1922 | MacDonald | F16H 48/08 475/233 |
| 3,490,312 | A | | 1/1970 | Seitz et al. | |
| 3,606,803 | A | * | 9/1971 | Ottennann | F16H 48/08 192/35 |
| 3,628,399 | A | | 12/1971 | Seitz et al. | |
| 3,896,684 | A | | 7/1975 | Duer | |

(Continued)

FOREIGN PATENT DOCUMENTS

WO 2003089812 A1 10/2003

*Primary Examiner* — Tisha D Lewis
(74) *Attorney, Agent, or Firm* — Quinn IP Law

(57) ABSTRACT

Limited slip differentials (LSD), methods for making and methods for using such LSDs, and motor vehicles employing an LSD. An LSD for a motor vehicle includes a differential casing that drivingly connects to the driveshaft, and two side gears rotatably mounted inside the casing. Each side gear drivingly connects to a respective axle shaft. One or both side gears includes a respective friction surface. One or more pinion gears are mounted inside the casing and meshingly engaged with the side gears. One or more friction plates are movably mounted inside the casing to selectively engage with and disengage from a friction surface. A centrifugal spring mass, which is mounted to one of the pinion gears, includes circumferentially spaced springs that expand responsive to a predetermined disparity in rotational speed between the side gears and thereby urge the friction plate(s) into engagement with the friction surface(s).

20 Claims, 2 Drawing Sheets

(56) References Cited

U.S. PATENT DOCUMENTS

| | | | | |
|---|---|---|---|---|
| 4,265,143 | A | * | 5/1981 | Goscenski, Jr. ........ F16H 48/08 475/232 |
| 4,825,724 | A | * | 5/1989 | Shibuya .................. F16H 48/08 475/232 |
| 5,471,390 | A | | 11/1995 | Sasaki |
| 6,319,166 | B1 | * | 11/2001 | Kyle ....................... F16H 48/08 475/232 |
| 7,444,222 | B2 | | 10/2008 | Villella et al. |
| 7,537,538 | B2 | | 5/2009 | Ross et al. |
| 7,749,123 | B2 | | 7/2010 | Miao et al. |
| 7,801,657 | B2 | | 9/2010 | Piyabongkam et al. |
| 8,216,106 | B2 | * | 7/2012 | Curtis .................... F16H 48/08 475/235 |
| 9,382,990 | B2 | | 7/2016 | Nolte et al. |
| 2013/0231837 | A1 | | 9/2013 | Holbrook et al. |

* cited by examiner

LIMITED SLIP DIFFERENTIALS WITH CENTRIFUGAL SPRING MASS ACTUATOR FOR VEHICLE POWERTRAINS

INTRODUCTION

The present disclosure relates generally to powertrains for motor vehicles. More specifically, aspects of this disclosure relate to drivetrain differentials with limited slip capabilities.

Current production motor vehicles, such as the modern-day automobile, are originally equipped with a powertrain that operates to propel the vehicle and power the onboard vehicle electronics. The vehicle powertrain, which is inclusive of, and oftentimes misclassified as, a drivetrain system, is generally comprised of a prime mover that delivers driving power to the vehicle's final drive system (e.g., rear differential, axle, and road wheels) through a multi-speed power transmission. Automobiles have normally been propelled by a reciprocating-piston type internal combustion engine because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid vehicles, on the other hand, utilize alternative power sources, such as fuel cell or battery powered electric motors, to propel the vehicle, minimizing reliance on the engine for power and increasing overall fuel economy.

Many powertrain systems employ a differential gear train to transmit rotational torque and power from the vehicle's prime mover(s) and power transmission to the vehicle's forward road wheels, for "front differential" configurations, or rear road wheels, for "rear differential" configurations. In general, a differential is a mechanical gear system that allows each wheel in a pair of driving road wheels to rotate at different speeds. During vehicle cornering, for example, the inside road wheels, i.e., those closest to the center of the radius of the turn, travel a shorter distance than the vehicle wheels that are on the outside of the turn. Without a differential, the inside wheels may end up slipping during cornering, while the outside wheels may end up dragging. A differential mitigates this issue by dedicating an independently rotatable output shaft, known as "axle shafts," to each drive wheel such that the inside and outside wheels can rotate separately from each other thereby allowing the wheels to maintain traction with the road.

A standard or "open" differential, which typically acts as the final gear reduction for the vehicle drivetrain, tends to transmit a largely equivalent amount of torque to both drive wheels. Under certain driving conditions, however, an open differential may transfer a majority its drive torque to a wheel of least resistance, e.g., one that has temporarily lost road contact (e.g., is "unloaded") or one that experiences reduced frictional contact with the road (e.g., is "slipping"). In such situations, the unloaded/slipping wheel may rotate freely, thus converting a sizeable amount of drive torque into tire slip rather than tractive power. To counteract this inadvertent loss of effective drive torque, certain vehicles employ a positive traction ("posi-trac") limited slip differential (LSD) that allows for some difference in angular velocity of the differential output shafts, but imposes a mechanical threshold on any such disparity. This mechanical limit is normally provided via hydrodynamic viscous brakes, frictional clutch packs, helical lockup gears, or hydraulic clutches. By limiting the difference in angular velocity between the road wheels, useful torque is transmitted to the road surface so long as traction is generated by at least one of the wheels.

SUMMARY

Disclosed herein are limited slip differentials with centrifugal-spring actuated friction plates, methods for making and methods for using such limited slip differentials, and motor vehicles with a limited slip differential for selectively transferring power from the vehicle's power transmission to a pair of road wheels of the final drive system. By way of example, and not limitation, there is presented a unique limited slip differential with centrifugal spring masses and friction plates cooperatively configured to enable torque flow when a vehicle wheel slips or unloads. These centrifugal springs expand and engage the friction plates when there is a predetermined (high) disparity in wheel speed, such as when one of the wheel slips, to help equalize wheel speed. In an example, an individual hollow shaft protrudes from each of two bevel pinion gears (also known as "spider gears") spaced in face-to-face relation inside of the differential housing. Attached to the end of each hollow shaft is a series of circumferentially spaced centrifugal springs interconnected by spring masses. With this arrangement of centrifugal springs and spring masses, the springs will expand radially outward when there is a difference between the relative speeds of the two axle half shafts. As these springs expand, they push adjacent friction plates away from the central cross shaft onto which the spider gears are mounted. When the slip increases to a certain limit, the centrifugal springs sufficiently expand to press the friction plates into engagement with complementary friction surfaces attached to the differential side gears to lock the differential. A return mechanism engaged with the springs helps to ensure that the locking phenomenon is negated once the slip is reduced below the aforementioned limit. This orientation also helps to ensure that the springs do not inadvertently expand when the differential is operating at high speeds without any tire slip.

Attendant benefits for at least some of the disclosed concepts include a limited slip differential (LSD) architecture with fewer components and no complex electronic or hydrodynamic hardware. When compared to mechanical clutch LSD designs, for example, disclosed LSD architectures eliminate the clutch pack, clutch housing, and expansion plates. As such, disclosed LSD architectures help to reduce part and assembly costs, and offer a more compact and lighter weight solution, which helps to reduce gross vehicle weight and minimize packaging space requirements. In addition, there is no loss of torque due to complex clutch pack activating mechanisms or diminished hydrodynamic fluid viscosity. Disclosed LSD designs also help to eliminate design complications and warranty issues associated with hydraulically actuated clutch mechanisms. Disclosed LSD features also help to resolve issues associated with the differential locking when there is no wheel slip. At least some of the disclosed LSD architectures, while useful for certain two-wheel drive (2WD) and front-wheel drive (FWD) applications, have particular applicability to four-wheel drive (4WD) and all-wheel drive (AWD) powertrains.

Aspects of the present disclosure are directed to limited slip differentials (LSD) with centrifugal spring mass actuators for frictionally locking the LSD. Disclosed, for example, is a limited slip differential for a motor vehicle. The motor vehicle includes a prime mover, such as an engine and/or a motor, that is operatively connected to a driveshaft, and a pair of axle shafts each operatively connected to a respective road wheel. The LSD includes a rotatable differential casing that drivingly connects to the driveshaft, and a pair of side gears rotatably mounted inside the differential casing. Each side gear drivingly connects to a respective axle shaft. One or both of the side gears includes a respective friction surface. A pair of pinion gears is mounted inside the differential casing and meshingly engaged with the side gears. One or more friction plates are movably mounted inside the differential casing to selectively engage with and disengage from a friction surface of a side gear. One or more centrifugal spring masses is mounted to one or more of the pinion gears for common rotation therewith. Each centrifugal spring mass includes circumferentially spaced springs that expand in response to a predetermined disparity in rotational speed between the side gears and thereby urge the friction plate(s) into engagement with the friction surface(s).

Other aspects of the present disclosure are directed to motor vehicles with centrifugal spring actuated LSD architectures. A "motor vehicle," as used herein, may include any relevant vehicle platform, such as passenger vehicles (internal combustion engine (ICE), hybrid electric, full electric, fuel cell, fuel cell hybrid, fully or partially autonomous, etc.), commercial vehicles, industrial vehicles, tracked vehicles, off-road and all-terrain vehicles (ATV), farm equipment, trains, boats, etc. In an example, a motor vehicle is presented that includes a vehicle chassis frame a powertrain system and a final drive system mounted to the chassis frame. The powertrain includes a prime mover, such as an ICE or electric motor/generator, and a power transmission connecting the prime mover to a driveshaft. The final drive system includes multiple (e.g., two front and two rear) road wheels, and multiple axle shafts each drivingly connected to one of the wheels.

The foregoing motor vehicle also includes a limited slip differential with a differential casing that is rotatably mounted to the chassis frame and drivingly connected to the driveshaft, e.g., via interconnected ring and pinion gears, for common rotation therewith. Two bevel side gears are rotatably mounted inside the differential casing and each drivingly connected to a respective one of the axle shafts for common rotation. Each side gear includes a respective friction surface. Two bevel pinion gears are rotatably mounted inside the differential casing and both meshingly engaged with the side gears. A pair of friction plates is slidably mounted inside the differential casing. Each friction plate slides into and out of frictional engagement with a respective friction surface. A respective centrifugal spring mass is mounted to each of the pinion gears for common rotation therewith. Each centrifugal spring mass includes a respective series of circumferentially spaced springs that expand in response to a predetermined disparity in rotational speed between the side gears. These expanding springs urge the friction plates into engagement with the friction surfaces with sufficient force to lock the side gears to the differential casing such that the axle shafts rotate substantially in unison.

Additional aspects of this disclosure are directed to methods of making and methods of using limited slip differentials with centrifugal spring mass actuators for frictionally locking the LSD. For instance, a method is disclosed for assembling a limited slip differential for a motor vehicle. The method includes, in any order and in any combination: rotatably mounting a pair of side gears inside a differential casing, the differential casing being configured to drivingly connect to a driveshaft, and each of the side gears being configured to drivingly connect to a drive wheel via a respective axle shaft, one or both of the side gears including a respective friction surface; rotatably mounting one or more pinion gears inside the differential casing such that the pinion gears meshingly engage with the side gears; movably mounting one or more friction plates inside the differential casing such that each friction plate selectively engages with and disengages from a friction surface of a respective side gear; and, mounting one or more centrifugal spring masses to one or more of the pinion gears for common rotation therewith, each centrifugal spring mass including circumferentially spaced springs configured to expand in response to a predetermined disparity in rotational speed between the side gears and thereby urge the friction plate(s) into engagement with the friction surface(s).

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
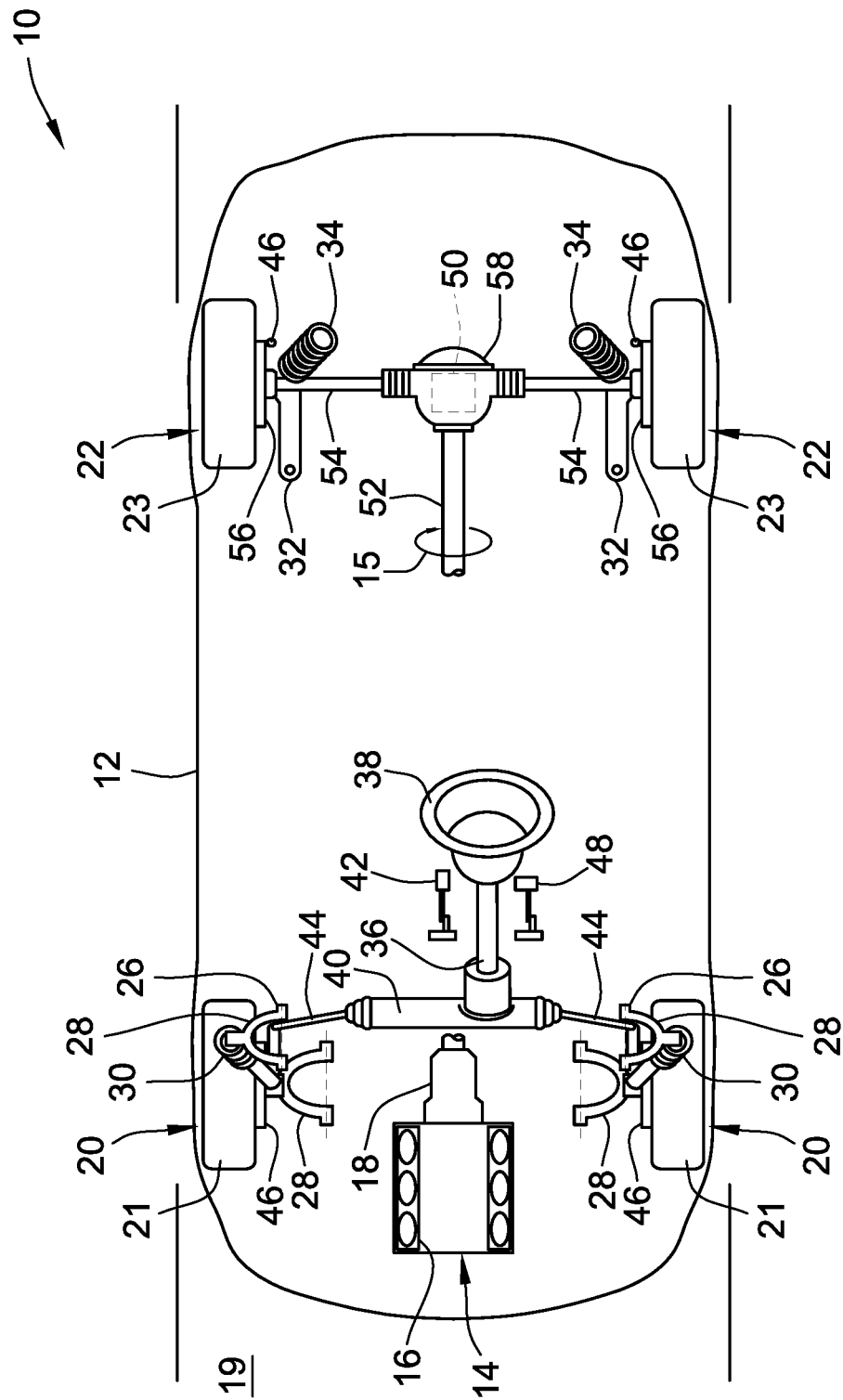
FIG. 1 is a schematic illustration of a representative motor vehicle with a centrifugal spring mass actuated limited slip differential in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the illustrated embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a schematic illustration of a representative automobile, which is designated generally at 10 and portrayed herein for purposes of discussion as an engine-powered sedan-style passenger vehicle. Mounted to the vehicle 10 chassis frame, e.g., aft of an engine compartment and underneath a rear trunk compartment, is a limited slip differential 50 that is drivingly connected to a prime mover 14 via a power transmission 18. The illustrated automobile 10—also referred to herein as "motor vehicle" or "vehicle" for short—is merely an exemplary application with which the novel aspects and features of this disclosure may be practiced. In the same vein, implementation of the present concepts into a rear differential architecture should also be appreciated as an exemplary application of the novel concepts disclosed herein. As such, it will be understood that the aspects and features of the present disclosure may be applied to other differential architectures, may be incorporated into different vehicle powertrain configurations, and may be implemented for any logically relevant type of motor vehicle. Lastly, the drawings presented herein are not necessarily to scale and are provided purely for instructional purposes. Thus, the specific and relative dimensions shown in the drawings are not to be construed as limiting.

Motor vehicle 10 of FIG. 1 is composed of a vehicle body and chassis frame 12 that operatively supports, for example, a suspensions system, a steering system, a powertrain system, and a final drive system. Only select components of the suspension, steering, powertrain and final drive systems are illustrated and described herein; nevertheless, the vehicle systems and devices discussed herein can include numerous additional and alternative features, options, and other well-known peripheral components without departing from the intended scope of this disclosure. By way of example, and not limitation, the vehicle powertrain is represented, in part, by a prime mover 14 that generates power and tractive torque 15 for propelling the vehicle 10 and operating any onboard vehicle electronics. In the example provided in FIG. 1, the prime mover 14 is a six-cylinder reciprocating-piston-type internal combustion engine 16 that is operatively connected, e.g., via a crankshaft or other output member (not shown), to a power transmission 18. For other vehicle powertrain configurations, the prime mover 14 may also or alternatively include other spark-ignited (SI) and compression-ignited (CI) engine configurations, one or more electric motor/generators, as well as a fuel cell or traction battery pack.

The vehicle's 10 final drive system is represented, in part, by four road wheels, including two front wheels 20 forward of the passenger compartment and two rear wheels 22 aft of the passenger compartment relative to a normal forward driving direction of the vehicle 10. Although four wheels 20, 22 are shown in FIG. 1, a vehicle with fewer or greater than four wheels is also envisioned. For purposes of discussion, a driver-side rear wheel 22 (on the bottom right-hand side of FIG. 1) can be designated a "first drive wheel" while a passenger-side rear wheel 22 (on the top right-hand side of FIG. 1) can be designated a "second drive wheel" of the vehicle 10. The rear wheels 22 and, optionally, the forward wheels 20 (depending on drivetrain configuration) are driven and rotated by the prime mover 14 for transmitting drive torque 15 to a road surface 19 to propel the vehicle 10. Each of the wheels 20, 22 includes a respective pneumatic tire 21 and 23, mounted on a central hub (not visible in the view provided). Although in the particular embodiment shown and described with respect to FIG. 1, the rear wheels 22 are depicted as the vehicle drive wheels, different embodiments may employ only the front wheels 20 as the vehicle drive wheels while other embodiments may employ all four wheels 20, 22 to drive the vehicle 10 along the road surface 19.

With continuing reference to FIG. 1, a vehicle suspension system operatively connects the vehicle wheels 20, 22 to the vehicle frame 12 and allows relative motion between the two, e.g., to help maintain contact between the wheels 20, 22 and road surface 19 and to help improve ride quality, handling and braking of the vehicle 10. This suspension system may include, as some non-limiting examples, an upper control arm 26, a lower control arm 28, and a strut 30 connected to each front wheel 20 and each rear wheel 20. The suspension system is also represented in the drawings by a trailing arm 32 and a spring 34 connected to each of the rear wheels 22. Although a specific suspension system configuration is shown in FIG. 1, other vehicle suspension designs are similarly envisioned. Fore and aft tires 21 and 23 establish a tractive effort with respect to the road surface 19 in response to loading on each tire transmitted through the suspension system during operation of the vehicle 10, as well as being affected by a friction coefficient between the tires and the particular road surface.

According to the representative vehicle architecture portrayed in FIG. 1, the vehicle 10 is originally equipped with a steering system that allows the driver to maintain a desired course for the vehicle and to control directional changes of the vehicle. For instance, the steering system is represented, in part, by a hand-operated steering wheel 38 that is operatively connected to the front wheels 20 via a collapsible or non-collapsible steering column assembly 36 and a rack-and-pinion assembly 40 with tie rods 44. The steering wheel 38 is located inside the passenger compartment of the vehicle 10 such that an operator may direct the vehicle to follow a particular path or assume a desired orientation with respect to the road surface 19. An accelerator pedal 42 is also positioned inside the passenger compartment and operatively connected to the prime mover 14 for the operator to regulate propulsion of the vehicle 10. For decelerating the vehicle 10, a braking system is provided that includes a braking mechanism 46 at some or all of the wheels 20, 22. While not shown in detail, it will be appreciated that each braking mechanism 46 may include a rotor or drum that is frictionally engaged by one or more brake pads or shoes through operation of a caliper or brake cylinder. A brake pedal 48, which is positioned inside the passenger compartment adjacent the accelerator pedal 42, is adapted to allow the vehicle operator to control the actuation of the brake system.

Figure 2:
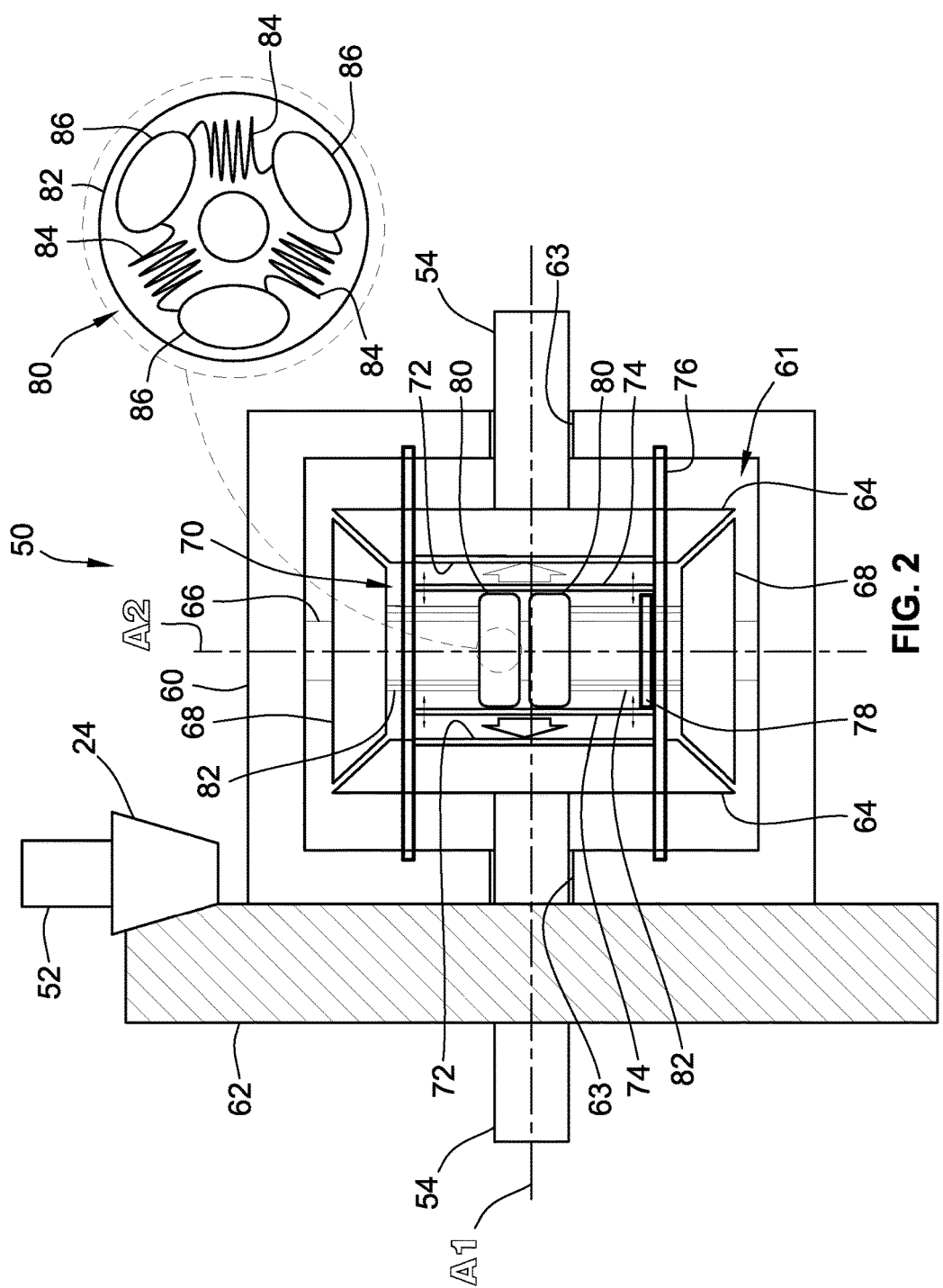
FIG. 2 is a schematic illustration of the representative limited slip differential of FIG. 1.

As additionally shown in FIG. 1, the vehicle's final drive system employs a limited slip differential (LSD) 50 that is operatively connected, as described in further detail below, to the prime mover 14 via a drive shaft 52 and a power transmission 18, which may be in the nature of a hydraulically actuated, 6-speed epicyclic transmission with hydrodynamic torque converter. Depicted herein as a rear differential architecture, the LSD 50 apportions at least some of the drive torque 15 generated by the internal combustion engine 16 between the first and second drive wheels 22. Each of two differential output shafts 54, also referred to herein as "axle shafts," is operatively connected at one end, e.g., via splined engagement, to the LSD 50 and at the opposite end, e.g., via a spindle 56, to a respective one of the drive wheels 22. The LSD 50 employs a centrifugal-spring-mass actuated lockup assembly 70, as best seen in FIG. 2, to limit the difference in angular velocity between the rear drive wheels 22, e.g., when one of these drive wheels becomes unloaded or otherwise loses traction. In so doing, useful drive torque is transmitted more efficiently to the road surface 19 as long as some traction is generated by at least one of the drive wheels 22.

Turning next to FIG. 2, there is shown a schematic illustration of the limited slip differential 50 of FIG. 1. The LSD 50 is composed of a unitary differential casing 60 that is fabricated from cast metal, molded reinforced polymer, or other sufficiently durable and resilient material. The differential casing 60 is rotatably mounted inside of an axle housing 58 (FIG. 1), which is anchored to the vehicle chassis frame 12 and composed of a carrier housing and cover, bearing caps, axle tubes, etc., as some non-limiting example parts. This axle housing 58 may define an internal cavity that forms a fluid sump for stowing a liquid lubricant, e.g., for lubricating the LSD 50 during rotation thereof. Drive torque generated by ICE assembly 16, and transferred through power transmission 18 and drive shaft 52, is transmitted to the differential casing 60 via a drive pinion gear 24 intermeshed with a complementary ring gear 62. For at least some embodiments, the differential casing 60 may be a bipartite or tripartite construction made of two rigid shells fastened to each other, e.g., by means of bolts, with the ring gear 62 integrally formed with, bolted to, or otherwise mounted on one of the casing 60 shells.

The differential casing 60 has an internal cavity 61 with diametrically opposed openings 63 extending through laterally spaced outer walls of the casing 60. Two side gears 64 are located inside the internal cavity 61 and rotatably mounted, e.g., via respective roller bearings or other known means, to the differential casing 60. Each side gear 64 may be concentrically aligned with and positioned over one of the openings 63 to receive a splined end of a respective axle shaft 54 for common rotation therewith. A pinion shaft 66 located inside the internal cavity 61 is securely mounted to the differential casing 60 and orthogonally oriented with respect to a rotational axis A1 of the side gears 64. Two diametrically opposed pinion gears 68 are located inside the internal cavity 61 and rotatably mounted on the pinion shaft 66 to rotate about a second rotational axis A2. In the illustrated example of FIG. 2, the side gears 64 and pinion gears 68 each take on a straight bevel gear configuration. Both of the pinion gears 68 are meshingly engaged with both of the side gears 64, while all four gears are rotatably mounted inside the rotatable casing 60 such that the axle shafts 54 can rotate at different speeds. If so desired, the gear ratio between the encased gears may provide a mechanical advantage (e.g., a desired final reduction). It is also envisioned that the LSD 50 comprise greater or fewer than two pinion gears 68, and that the gears 64, 68 take on other gear configurations, such as spiral bevel gear, spur gear, worm gear, etc.

To help equalize wheel speed during slippage or unloading of a drive wheel 22, the LSD 50 is equipped with a centrifugal-spring-mass actuated lockup mechanism 70 that operates to progressively lock the side gears 64 to the differential casing 60. In accord with the representative configuration of FIG. 2, the lockup mechanism 70 includes one or more friction surfaces 72 (two distinct friction surfaces are shown in the drawings), each of which is integrally formed with, mounted on, or otherwise rigidly secured to an inwardly facing surface of at least one of the side gears 64. A corresponding number of friction plates 74 (two distinct friction plates are shown) is slidably mounted inside the differential casing 60, e.g., on opposite sides of the pinion shaft 66 proximal the friction surfaces 72. For instance, a pair of slide rails 76 are rigidly secured to the differential casing 60, extending transversely across the central cavity 61 on opposing sides to the openings 63. These slide rails 76 cooperatively slidably mount the two illustrated friction plates 74 to the differential casing 60 such that each friction plate 74 may selectively slide into and out of friction engagement with a respective one of the friction surfaces 72. As shown in FIG. 2, a left-most (first) friction plate 74 selectively engages with and disengages from a (first) friction surface 72 on a left-most (first) side gear 64. In the same vein, a right-most (second) friction plate 74 selectively engages with and disengages from a (second) friction surface 72 on a right-most (second) side gear 64. An optional return mechanism, which may be in the nature of a leaf or helical spring 78 interposed between and mechanically coupling the friction plates 74, biases the friction plates 74 towards each other and away from their respective friction surfaces 72.

Mounted to one or both of the pinion gears 68 for common rotation therewith (i.e., to rotate substantially or completely in unison) is a centrifugal spring mass 80 that is activated by rotation of the pinion gears 68, which occurs in response to a disparity in rotational speeds between the side gears 64. As shown in FIG. 2, a forward (first) centrifugal spring mass 80 is mounted for unitary rotation to a forward (first) pinion gear 68, while a rearward (second) centrifugal spring mass 80 is mounted for unitary rotation to a rearward (second) pinion gear 68. While not per se required, the two illustrated centrifugal spring masses 80 are substantially identical to each other; thus, for purposes of brevity, structural features of both centrifugal spring masses can be described by way of reference to the first centrifugal spring mass 80, which is separately depicted in the inset view of FIG. 2. A sleeve shaft 82 is disposed within the internal cavity 61, coaxially aligned with the pinion gear 68. This sleeve shaft 82, which circumscribes a portion of the pinion shaft 66, mounts the centrifugal spring mass 80 to the pinion gear 68. In particular, a distal (first) end of the sleeve shaft 82 is rigidly attached, e.g., via threads, roll pin, welding, etc., to the pinion gear 68 for common rotation therewith. The centrifugal spring mass 80 includes an actuator disc 82 that is rigidly attached, e.g., via threads, key lock, welding, etc., to a proximal (second) end of the sleeve shaft 82 opposite the end secured to the pinion gear 68.

Referencing the inset view of FIG. 2, centrifugal spring mass 80 employs a series of circumferentially spaced springs 84 that expand in response to a predetermined disparity in rotational speed between the side gears 64. While shown with three helical springs 84 spaced equidistant around the actuator disc 82, the centrifugal spring mass 80 may comprise greater or fewer springs, with similar of different structural configurations, and/or spaced or oriented in varying arrangements. Interposed between and interconnecting adjacent springs 84 is a movable mass 86. While shown having an elliptical shape with the long dimension thereof aligned about the circumference of the disc, the movable masses 86 may take on alternative shapes, sizes and orientations from that which are shown in the drawings. With the structural architecture shown in the drawings, the springs 84 assisted by the movable masses 86 of each centrifugal spring mass 80 expand in response to the predetermined minimum disparity in rotational speed between the side gears 64. This spring expansion urges the friction plates 74 away from each other and into engagement with the friction surfaces 72 such that the side gears gradually lock to the differential casing 60, which causes the axle shafts 54 to begin rotating in unison. A spring stiffness of the circumferentially spaced springs 84 may be adapted such that the springs 84 only expand with sufficient force to frictionally lock the friction plates 74 to the friction surface 72 once the difference in rotational speed between the side gears 64 exceeds the aforementioned predetermined disparity.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A limited slip differential for a motor vehicle, the motor vehicle including a prime mover operatively connected to a driveshaft, and a pair of axle shafts each operatively connected to a respective one of a pair of road wheels, the limited slip differential comprising:
    a differential casing configured to drivingly connect to the driveshaft;
    a pair of side gears rotatably mounted inside the differential casing and each configured to drivingly connect to a respective one of the axle shafts, a first of the side gears including a first friction surface;
    a pair of pinion gears mounted inside the differential casing and meshingly engaged with the pair of side gears;
    a first friction plate movably mounted inside the differential casing and configured to selectively engage with and disengage from the first friction surface; and
    a centrifugal spring mass mounted to a first of the pinion gears for common rotation therewith, the centrifugal spring mass including a plurality of circumferentially spaced springs configured to expand in response to a predetermined disparity in rotational speed between the side gears and thereby urge the first friction plate into engagement with the first friction surface.

2. The limited slip differential of claim 1, wherein a second of the side gears includes a second friction surface, the limited slip differential further comprising a second friction plate movably mounted inside the differential casing and configured to selectively engage with and disengage from the second friction surface.

3. The limited slip differential of claim 1, further comprising a second centrifugal spring mass mounted to a second of the pinion gears for common rotation therewith, the second centrifugal spring mass including a second plurality of circumferentially spaced springs configured to expand in response to the predetermined disparity in rotational speed between the side gears and thereby urge the first friction plate into engagement with the first friction surface.

4. The limited slip differential of claim 1, further comprising:
    a pinion shaft rotatably mounting the pinion gears to the differential casing;
    a sleeve shaft circumscribing the pinion shaft and mounting the centrifugal spring mass to the first pinion gear.

5. The limited slip differential of claim 4, wherein a first end of the sleeve shaft is rigidly attached to the first pinion gear, and wherein the centrifugal spring mass includes a disc mounted to a second end of the sleeve shaft opposite the first end.

6. The limited slip differential of claim 1, further comprising a return mechanism biasing the first friction plate away from the first friction surface.

7. The limited slip differential of claim 6, wherein the return mechanism includes a helical spring or leaf spring coupled to the first friction plate.

8. The limited slip differential of claim 1, further comprising a slide rail slidably mounting the first friction plate to the differential casing.

9. The limited slip differential of claim 1, wherein the centrifugal spring mass further comprises a plurality of masses interconnecting the plurality of circumferentially spaced springs.

10. The limited slip differential of claim 1, wherein each of the circumferentially spaced springs includes a spring stiffness configured such that the springs expand sufficiently to urge the first friction plate into engagement with the first friction surface and thereby lock the side gears together only in response to the rotational speed between the side gears exceeding the predetermined disparity.

11. The limited slip differential of claim 1, wherein the side gears and the pinion gears each comprise a respective bevel gear.

12. The limited slip differential of claim 1, further comprising a driving ring gear mounted to the rotatable differential casing for common rotation therewith.

13. The limited slip differential of claim 1, wherein the first friction surface is mounted on or integrally formed with the first side gear.

14. A motor electric vehicle, comprising:
    a vehicle chassis frame;
    a powertrain system mounted to the vehicle chassis frame and including a prime mover, a driveshaft, and a power transmission connecting the prime mover to the driveshaft;
    a final drive system mounted to the vehicle chassis frame and including a plurality of road wheels and a plurality of axle shafts each drivingly connected to a respective one of the road wheels; and
    a limited slip differential including:
        a differential casing rotatably mounted to the vehicle chassis frame and drivingly connected to the driveshaft for common rotation therewith;
        a pair of bevel side gears rotatably mounted inside the differential casing and each drivingly connected to a respective one of the axle shafts for common rotation, each of the side gears including a respective friction surface;
        a pair of bevel pinion gears rotatably mounted inside the differential casing and meshingly engaged with the pair of side gears;
        a pair of friction plates slidably mounted inside the differential casing and each configured to slide into and out of friction engagement with a respective one of the friction surfaces of the side gears; and
        a pair of centrifugal spring masses each mounted to a respective one of the pinion gears for common rotation therewith, each centrifugal spring mass including a respective plurality of circumferentially spaced springs, the springs being configured to expand in response to a predetermined disparity in rotational speed between the side gears and thereby urge the friction plates into engagement with the friction surfaces such that the side gears lock to the differential casing and the axle shafts rotate substantially in unison.

15. A method of assembling a limited slip differential for a motor vehicle, the motor vehicle including a prime mover operatively connected to a driveshaft, and a pair of axle shafts each operatively connected to a respective one of a pair of road wheels, the method comprising:
rotatably mounting a pair of side gears inside a differential casing, the differential casing being configured to drivingly connect to the driveshaft, and each of the side gears being configured to drivingly connect to a respective one of the axle shafts, a first of the side gears including a first friction surface;
rotatably mounting a pair of pinion gears inside the differential casing such that the pinion gears meshingly engage with the side gears;
movably mounting a first friction plate inside the differential casing such that the first friction plate selectively engages with and disengages from the first friction surface; and
mounting a centrifugal spring mass to a first of the pinion gears for common rotation therewith, the centrifugal spring mass including a plurality of circumferentially spaced springs configured to expand in response to a predetermined disparity in rotational speed between the side gears and thereby urge the first friction plate into engagement with the first friction surface.

16. The method of claim 15, wherein a second of the side gears includes a second friction surface, the method further comprising movably mounting a second friction plate inside the differential casing such that the second friction plate selectively engages with and disengages from the second friction surface.

17. The method of claim 15, further comprising mounting a second centrifugal spring mass to a second of the pinion gears for common rotation therewith, the second centrifugal spring mass including a second plurality of circumferentially spaced springs configured to expand in response to the predetermined disparity in rotational speed between the side gears and thereby urge the first friction plate into engagement with the first friction surface.

18. The method of claim 15, wherein rotatably mounting the pinion gears inside the differential casing includes mounting both of the pinion gears to a pinion shaft, and mounting the pinion shaft to the differential casing.

19. The method of claim 18, wherein mounting the centrifugal spring mass to the first pinion gear includes mounting the centrifugal spring mass to a sleeve shaft, and mounting the sleeve shaft to the first pinion gear such that the sleeve shaft circumscribes the pinion shaft.

20. The method of claim 15, wherein movably mounting the first friction plate inside the differential casing includes mounting the first friction plate to a slide rail, and slidably mounting the slide rail to the differential casing.

* * * * *